US011636433B2

(12) United States Patent
Ferguson et al.

(10) Patent No.: US 11,636,433 B2
(45) Date of Patent: Apr. 25, 2023

(54) SYSTEM AND METHOD FOR THE DETECTION AND VISUALIZATION OF REPORTED ETHICS CASES WITHIN AN ORGANIZATION

(71) Applicant: Walmart Apollo, LLC, Bentonville, AR (US)

(72) Inventors: David Ferguson, Bentonville, AR (US); Saba Beyene, Fayetteville, AR (US); Bin Liu, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 412 days.

(21) Appl. No.: 16/216,317

(22) Filed: Dec. 11, 2018

(65) Prior Publication Data

US 2019/0180246 A1 Jun. 13, 2019

Related U.S. Application Data

(60) Provisional application No. 62/596,989, filed on Dec. 11, 2017.

(51) Int. Cl.
*G06Q 10/00* (2012.01)
*G06Q 10/105* (2023.01)
(Continued)

(52) U.S. Cl.
CPC ........... *G06Q 10/105* (2013.01); *G06F 40/20* (2020.01); *G06N 20/20* (2019.01)

(58) Field of Classification Search
CPC ...... G06Q 10/105; G06N 20/20; G06N 20/10; G06F 40/216; G06F 40/30; G06F 40/20
See application file for complete search history.

(56) References Cited

U.S. PATENT DOCUMENTS 9,552,548 B1 * 1/2017 Brestoff .................. G06N 3/04
10,600,067 B2 * 3/2020 Tiell .................. G06Q 30/0205
(Continued)

OTHER PUBLICATIONS

Azeez, Tokunbo R., Jay G. Martin, Martin Scott Craighead. "Good Ethics Makes Good Business Sense". International Petroleum Technology Conference, Kuala Lumpur, Malaysia, Dec. 2008. https://doi.org/10.2523/IPTC-12543-MS. Published Dec. 3, 2008.*

(Continued)

*Primary Examiner* — Gabrielle A McCormick
(74) *Attorney, Agent, or Firm* — Fitch, Even, Tabin & Flannery LLP (57) ABSTRACT

An system and a method for the detection and visualization of reported ethics cases is disclosed. The system receives a set of digital records corresponding to a reported ethics violations. The system converts each of the digital records from the set of digital records into a common digital format. The system deconstructs the uniform text structure of each digital recorded by a natural language processing module to lemmatize words, remove punctuation, and remove stop words. The system inputs each deconstructed uniform text structure into a binary machine learning data model. The system inputs each deconstructed uniform text structure into a multiclass machine learning data model. The system inputs the determined value and the label to an ensemble machine learning data model. The system prioritizes reported ethics violations into one or more lists based on the determination of the possible class and transmits the list to a user interface.

17 Claims, 6 Drawing Sheets

(51) Int. Cl.
*G06N 20/20* (2019.01)
*G06F 40/20* (2020.01)

(56) References Cited

U.S. PATENT DOCUMENTS

| | | | | |
|---|---|---|---|---|
| 2007/0089092 | A1* | 4/2007 | Schmidt | G06F 8/10 717/126 |
| 2009/0063387 | A1* | 3/2009 | Beaty | G06N 5/04 706/50 |
| 2010/0082333 | A1* | 4/2010 | Al-Shammari | G06F 40/242 704/10 |
| 2010/0191731 | A1* | 7/2010 | Rus | G06F 16/355 707/737 |
| 2017/0019315 | A1* | 1/2017 | Tapia | G06N 20/00 |
| 2017/0069033 | A1* | 3/2017 | Hales | G06Q 40/08 |
| 2017/0316438 | A1* | 11/2017 | Konig | G06Q 30/0204 |
| 2017/0364934 | A1* | 12/2017 | Tiell | G06Q 30/0201 |
| 2018/0293462 | A1* | 10/2018 | Ambati | G06N 5/022 |
| 2019/0034591 | A1* | 1/2019 | Mossin | G06N 3/08 |
| 2019/0180246 | A1* | 6/2019 | Ferguson | G06F 40/216 |

OTHER PUBLICATIONS

International Search Report and Written Opinion from related International Patent Application No. PCT/US2018/064967 dated Mar. 18, 2019.

* cited by examiner

SYSTEM AND METHOD FOR THE DETECTION AND VISUALIZATION OF REPORTED ETHICS CASES WITHIN AN ORGANIZATION

CROSS-REFERENCE TO RELATED PATENT APPLICATIONS

This application claims priority to U.S. Provisional Application No. 62/596,989 filed on Dec. 11, 2017, the content of which is hereby incorporated by reference in its entirety.

BACKGROUND

Claims regarding ethics violations within an organization originate through disparate reporting systems. The mechanics in evaluating the claims from these disparate reporting systems are inefficient, subjective, and inconsistent.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein is a system that receives claims from disparate sources within an organization and determines whether one or more of the claims correspond to ethics claims. In exemplary embodiments, the claims from the disparate sources are preprocessed and converted to common digital format. The resultant converted claims are input into a sequence of machine learning models. For example, the resultant converted claims are input into a binary machine learning data model to determine whether the claim is an ethics claim. Additionally the resultant converted claims are input into a multi-class machine learning model to determine a classification for each the converted claims. The converted claims are prioritized based on the results from the machine learning models, and provided to user interface for investigation according the prioritization.

Figure 1:
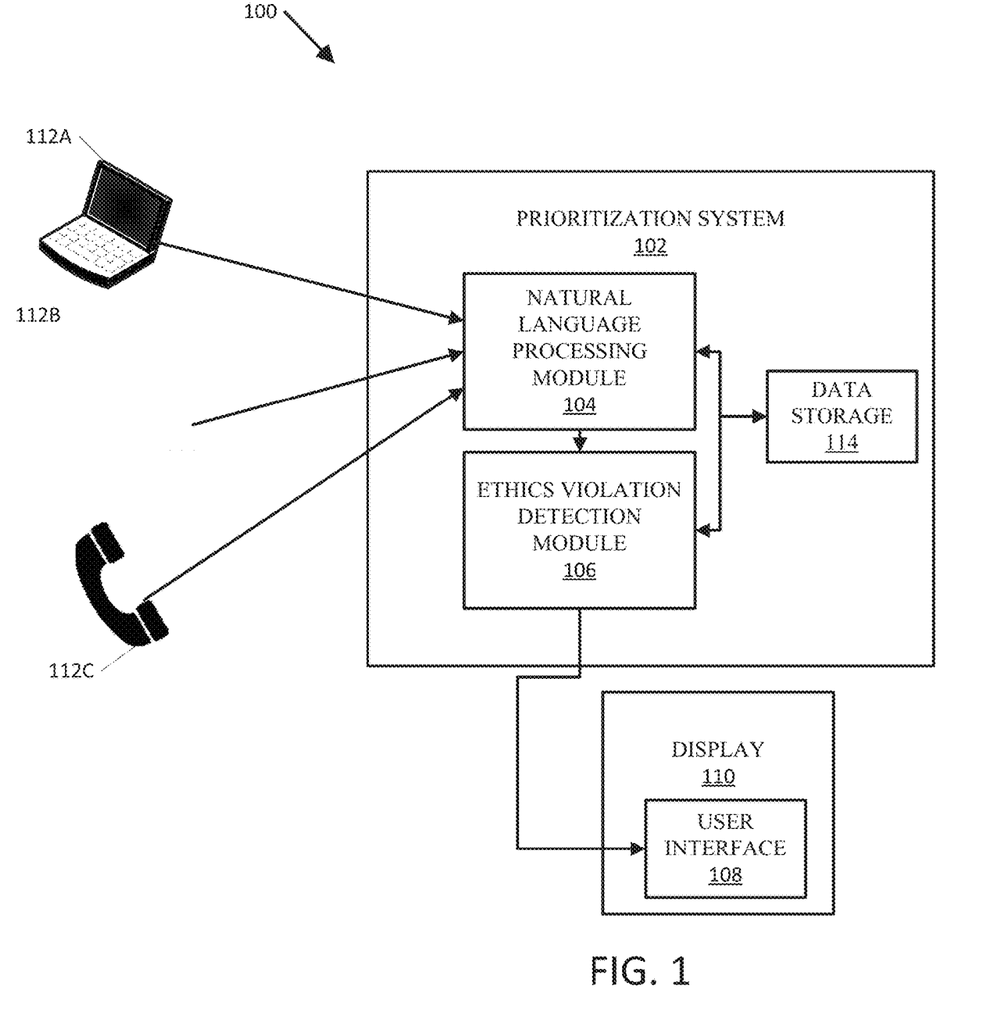
FIG. 1 is a block diagram illustrating a system for the detection and visualization of ethics cases from reported claims from a plurality of disparate sources according to an exemplary embodiment.

FIG. 1 is a block diagram illustrating a system 100 for the detection and visualization of ethics cases from a plurality of reported claims according to an exemplary embodiment. The system includes a prioritization system 102 comprising a natural language processing module 104, an ethics violation detection module 106, and data storage 114. A display 110 configured to present a user interface 108 can be communicatively coupled to the prioritization system.

The prioritization system 102 hosts processing components for the system to facilitate detection and visualization of ethics cases from reported claims. The prioritization system 102 can be implemented on one or more computing devices. As a non-limiting example, implementation of the prioritization system 102 can take the form of one or more computing devices implemented as one or more physical servers or one or more computing device implementing one or more virtual servers. Hardware utilized for the system 100 can be distributed across logical resources allocated for the system 100 that can be housed in one server, or distributed virtually across multiple pieces of hardware.

The natural language processing (NLP) module 104 provides an entry point into the prioritization system 102 from various disparate source systems (e.g., submission systems 112A-C). An application programming interface (API) for the NLP module 104 provides an input point into the prioritization system 102. The API for the NLP module 104 can provide a well defined interface for the input of reported cases into the prioritization system 102. The API for the NLP module 104 can provide bindings for popular software development languages including but not limited to C++ and JAVA. Additionally, the API for the NLP module 104 can provide bindings for popular scripting languages including but not limited to python and Perl. The NLP module 104 provides functionality for processing details of reported claims from the disparate source systems, where the reported claims from each respective disparate source system can have a different data structure formats, structures, text, characters, and the like. The processing functionality includes removing special characters and standard text from the reported claims from the disparate source systems. For example, the NLP module 104 can remove addressing header components from email sources. The NLP module 104 processes the details from reported claims to remove punctuation and stop words. Additionally, the NLP module 104 parses the remaining text to lemmatize words based on the part of sentence. The NLP module 104 utilizes the lemmatized words to create a data structure to be utilized in machine learning models. Each of the reported claims are parsed by the NLP module 104 and stored in a common digital format for uniform processing in a machine learning model.

An ethics violation detection module 106 receives input from the NLP module 104. The ethics violation detection module 106 receives each of the reported claims from the NLP module 104 in the common digital format. The ethics violation detection module 106 interfaces with two or more machine learning models. The ethics violation detection module 106 utilizes the reported claims in the common digital format as input as training or testing data for the one or more machine learning models. The ethics cases can be normalized by the ethics violation detection module 106 to provide appropriate input into the one or more machine learning models. The machine learning models can be a stand alone application or alternatively be provided as a third party library encompassing the functionality required to make predictive analysis based on a set of training data.

The two or more machine learning models utilized by the ethics violation detection module 106 can include, for example, a binary machine learning data model and a multi-class machine learning data model. The ethics violation detection module 106 utilizes the binary machine learning data model to infer whether a reported claim is actually an ethics case (e.g. a binary determination of yes or no), while the multi-class machine learning data model provides an inference as to what kind or class the ethics claim corresponds. Additionally, multi-label machine learning models can be utilized to add additional classifications to the ethics case in the event that the ethics case pertains to more than one classification. The resulting modelling can be input into an ensemble model (e.g. Random Forest model) to enhance predictive results. Additionally the ethics violation detection module 106 applies prioritization rules based on the classification results. As such, the ethics violation detection module 106 orders the set of ethics cases based on priority criteria that can utilize the classification results. Priority criteria as implemented by priority rules can include parties involved and the nature of the classification of the ethics case.

Coupled to the NLP module 104 and the ethics violation detection module 106 is data storage 114. Data storage 114 can be utilized for storing intermediate data product when utilizing large data sets such as when processing an ensemble model. Additionally, the data storage 114 provides non-volatile storage for the training results that applies to the testing data in subsequent processing. The data storage 114 can provide support for queuing the ethics case input in the event the NLP module 104 is saturated and cannot process the incoming ethics cases.

A user interface 108 presents the data output by the ethics violation detection module 106 on a display 110. The user interface 108 presents cases in either a batch view or an individual case detail view. The batch view displays more than one ethics case organized based on the binary classification and a prioritization based on the labeled classification. The individual case detail view provides organization based on the details of the case including the method of submission, text of the submission as well as the identified classification from the ethics violation detection module 106 pertinent to that specific case. The display 110 can take the form of a computer display. The display can be implemented by but not limited to cathode ray tube (CRT), light emitting diode (LED), organic light emitting diode (OLED), or liquid crystal display (LCD) technologies.

Exterior to the prioritization system 102 are the various submission systems 112A, 112B, 112C for reporting claims. The submission systems 112A, 112B, 112C can include but are not limited to computing devices, facsimile machines, and telephones. The submission systems 112A, 112B, 112C can each provide a different protocol for submitting a potential ethics violation. For example, the computing device embodiment can provide a website interface for enforcing a protocol for submission. A facsimile machine may provide a templatized form, coversheet and reporting telephone number, where the templatized form is processed by an optical character recognition system (OCR) prior to the input of the prioritization system 102, or alternatively as a component of the NLP module 104. A telephone submission can be a menu driven interactive voice response (IVR) system. Spoken interactions can be transposed via text-to-speech systems and provided as input to the NLP module 104.

Figure 2:
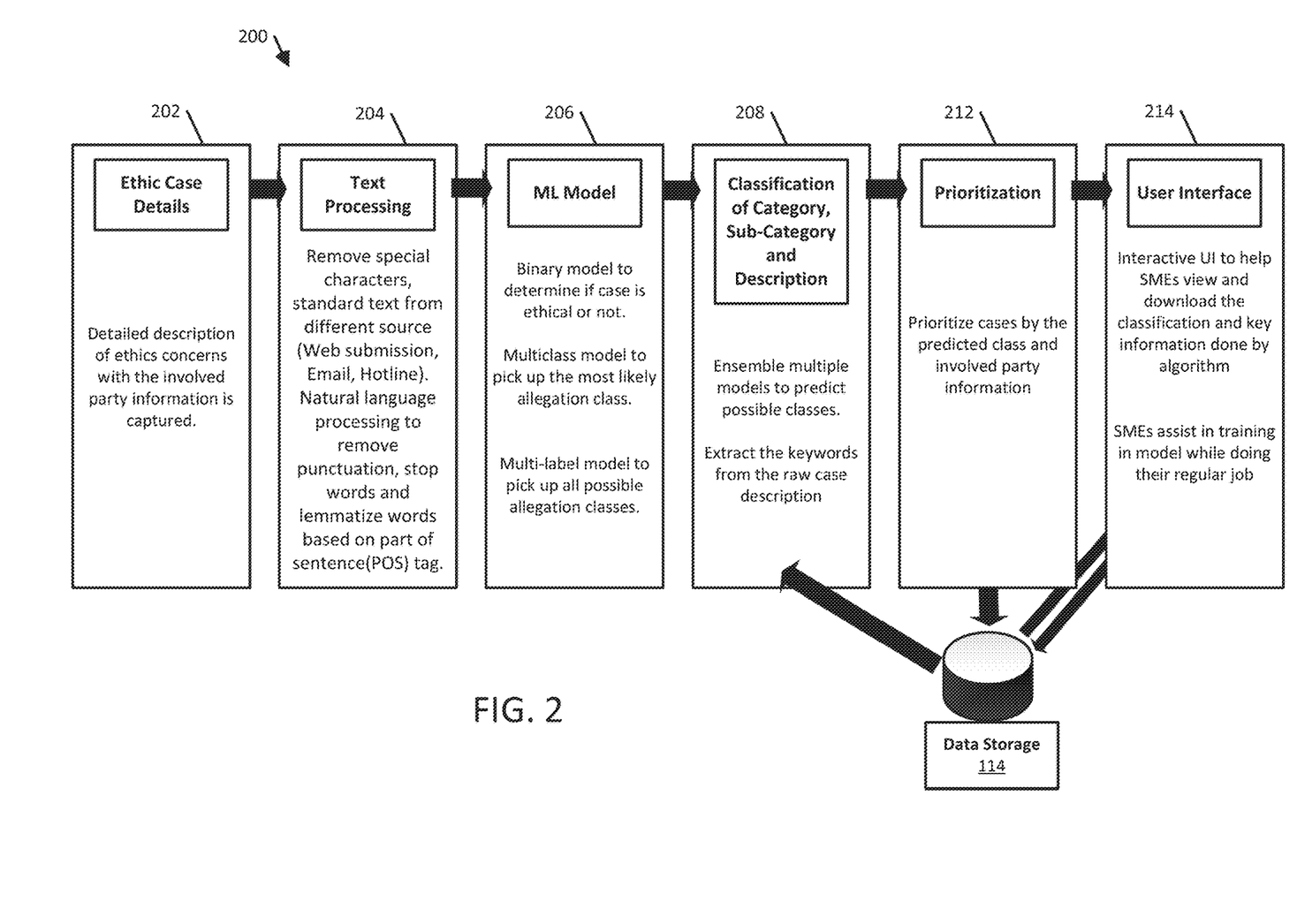
FIG. 2 is flow diagram illustrating a system for the detection and visualization of reported ethics cases according an exemplary embodiment.

FIG. 2 is flow diagram illustrating a process 200 implemented by an embodiment of the system for the detection and visualization of reported ethics cases according an exemplary embodiment.

At step 202, ethics case details are received through the submission systems 112A, 112B, 112C. A detailed description of ethics concerns with the involved party information is captured. The capture can be implemented through the multiple described submissions systems 112A, 112B, 112C mentioned above. The ethics case details can be received in various non-digital formats (e.g. voice, printed), however, the submission system 112A, 112B, 112C can convert the ethics case details to digital representations. As mentioned above, speech-to-text can convert voice recording to digital text analogous to OCR which can convert printed text to digital text. Alternatively, the conversion process can be implemented internal to the NLP module 106.

At step 204, the submitted ethics cases undergo text processing 204 by the NLP module 104. Special characters are removed from digitally submitted cases as well as erroneously translated ethics cases by any OCR software or text-to-speech software. Additionally standard text from different sources (e.g. web submission, email, telephone hotline) are removed from the cases. Standard text can include text in a digital format for the ethics case, intended for and used by another system, not including the NLP module 104. The standard text can also include supporting text utilized by the submission system 112A, 112B, 112C itself for the storage and retrieval of the ethics case itself. The NLP module 104 removes punctuation, stop words and lemmatizes words based on part of sentence (POS) tag. The NLP module 104 parses the digital ethics cases, identifies sentence structure, and analyzes the position of word forms within that structure to apply meaning to the specific words. The NLP module 104 converts the results from the lemmatizing process into a common digital format so that every input ethics case, regardless of submission system 112A, 112B, 112C is represented in the same digital manner. Ethics cases can be a file with multiple related cases or a single case.

At step 206, ethics cases in a common digital format are input into machine learning models. A binary machine learning data model is utilized to determine if a case is ethical or not. Resultant values can include that the case is an "allegation" or "no other allegation" (NOA). The binary machine learning data model can be based on the Term Frequency-Inverse Document Frequency of the words in each case. A multi-class model is utilized to determine the most likely allegation class. The feature model is based on Term Frequency-Inverse Document Frequency of the words in each case. Additionally, a multi-label model to pick up all possible allegation classes. A support vector machine or linear support vector classification (linearSVC) can be utilized to build a hyperplane to implement the multi-class and multi-label models, thereby classifying the ethics cases. Other classification models can be utilized to implement the classification. Prior to input into the machine learning models, the ethics cases in a common digital format can be normalized and converted to appropriate formats to be input into the models.

At step 208, the ethics detection violation module selects a classification of category, sub-category and description. The ethics detection violation module utilizes the output from the binary machine learning data model, the multi-class machine learning data model, and the multi-label machine learning data model as input into an ensemble models to predict possible classes with greater accuracy. The ensemble model can take the form of but is not limited to a Random Forest model. If a binary machine learning data model determines an "allegation", the ensemble model determines a classification from a set of classes. Keywords are extracted from the raw case description as determined by the normalized data input. The keywords can be stored in the data storage 114 for building the appropriate fields in the user interface 108, Based on the classification applied to the cases by the ensemble model, prioritization rules are applied by the ethics detection violation module 106 at step 212. The cases are prioritized based on the predicted class, the involved parties, and a set of rules established by the prioritization system 102 owner. In many embodiments, results from the binary machine learning data model indicating that the ethics case is not an actual ethics violation, are identified with a lower priority than the cases that are identified as actual ethics violations. Furthermore, ethics cases can be prioritized based level of severity or pervasiveness as determined by the owner of the prioritization system 102. Exemplary classes and labels corresponding to ethics cases may include "Alcohol and Drug", "Anti-Corruption", "Authority to Work", "Compliance", "Conflict of Interest", "Discrimination", "Failure to Report", "Financial Integrity", "Harassment", "Insider Trading", "Intentional Dishonesty", "Retaliation", "Third Party", "Wage and Hour", and "Workplace Violence."

At step 214, the prioritization of the ethics cases is presented in a user interface 108. The Interactive user interface is to help subject matter experts (SMEs) view and download the classification and key information done by prioritization system 102. SMEs assist in training in the machine learning models while doing their regular job of following up on all ethics cases. A SME can view the predictions, priorities and key information for multiple cases on the user interface and download relevant information. The SME can view the prediction and key information for an individual ethics case.

Figure 3:
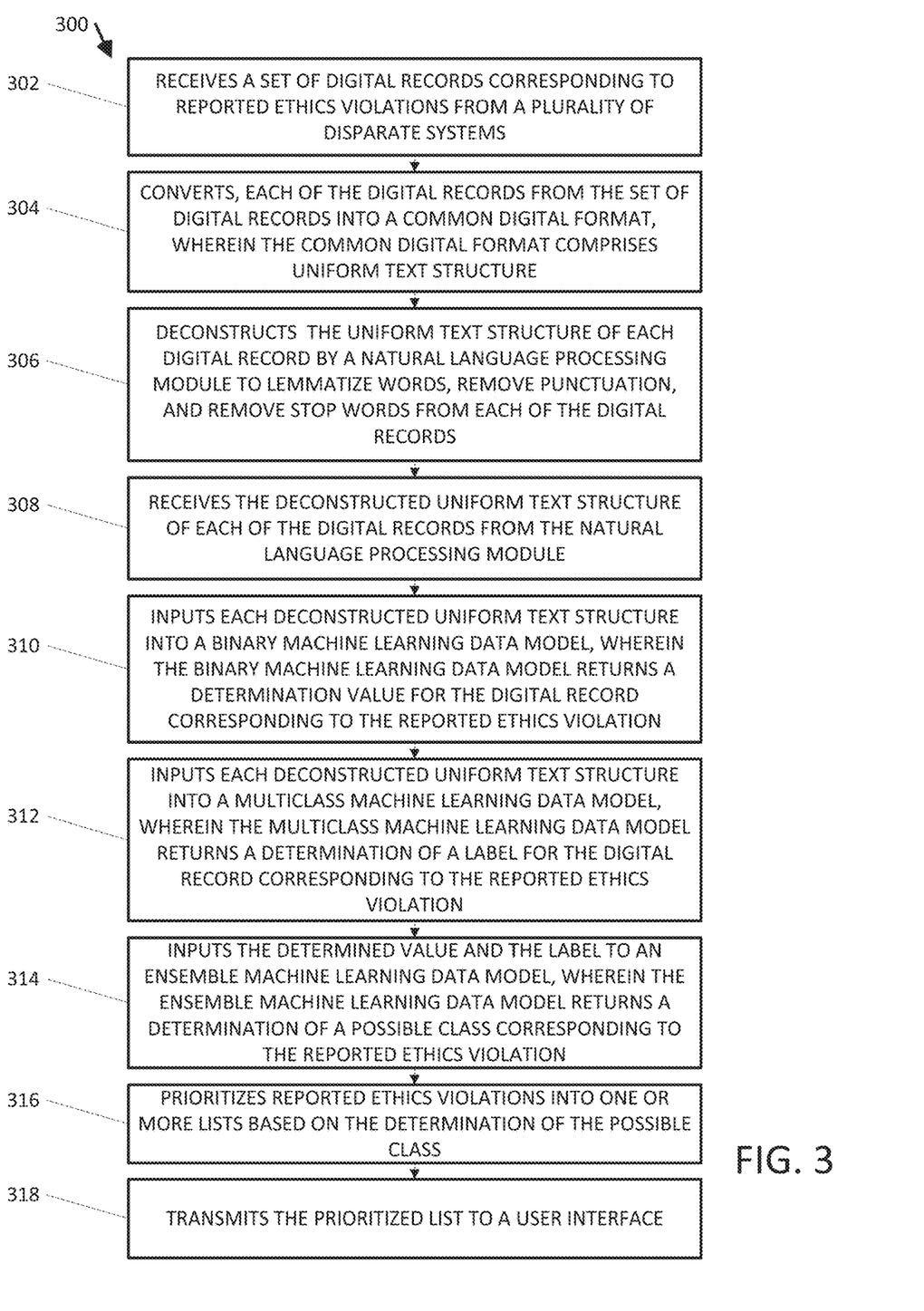
FIG. 3 is a flowchart illustrating a process for the detection and visualization of reported ethics cases according an exemplary embodiment.

FIG. 3 is a flowchart illustrating a process 300 for the detection and visualization of reported ethics cases according an exemplary embodiment.

At step 302, the natural language processing module 104 receives a set of digital records corresponding to a reported ethics violations from a plurality of disparate systems. As described above, the submissions systems 112A, 112B, 112C provide protocols for the submission of ethics claims. The submission systems 112A, 112B, 112C can operate independently of one another where claims are aggregated at a later point in their processing, but are not necessarily part of the same reporting system.

At step 304, the natural language processing module 104 converts each of the digital records from the set of digital records into a common digital format, wherein the common digital format comprise uniform text structure. The converting can include removing special characters and text formatting information from the respective submission system 112A, 112B, 112C from each digital record.

At step 306, the natural language processing module 104 deconstructs the uniform text structure of each digital recorded by a natural language processing module to lemmatize words, remove punctuation, and remove stop words from each of the digital records. The NLP module 104 can build a parse tree corresponding to the uniform text structure. Upon parse-tree construction, the NLP module 104 can utilized the lemmatized words within the structure to apply meaning based on the portion of the tree the lemmatized word appears.

At step 308, the ethics violation detection module 106 receives the deconstructed uniform text structure of each of the digital records from the natural language processing module. The ethics violation detection module 106 can receive the deconstructed uniform text structure across a network in an embodiment where the prioritization system 102 executes on distributed resources. Alternatively, in the embodiment where the prioritization system 102 executes on a single physical server, the deconstructed uniform text structure can be received in an inter-process message (IPM) or an event notification with a pointer to an address in memory where the deconstructed uniform text structure resides.

At step 310, the ethics violation detection module 106 inputs each deconstructed uniform text structure into a binary machine learning data model, wherein the binary machine learning data models returns a determination value for the digital record corresponding to the reported ethics violation. The binary machine learning data model can include a binary logistic regression model for determining a binary result.

At step 312, the ethics violation detection module 106 inputs each deconstructed uniform text structure into a multiclass machine learning data model, wherein the multiclass machine learning data models returns a determination of a label for the digital record corresponding to the reported ethics violation. Each deconstructed uniform text structure can be input into a multi-label machine learning data model, wherein the multi-label machine learning data model returns a determination of additional labels for the digital record corresponding to the reported ethics violation.

At step 314, the ethics violation detection module 106 inputs the determined value and the label to an ensemble machine learning data model, wherein the ensemble machine learning data model returns a determination of a possible class corresponding to the reported ethics violation. Additionally, in another embodiment, a resultant multi-label value from the multi-label machine learning data model, the label, and the additional labels can be input into to an ensemble machine learning data model, wherein the ensemble machine learning data model returns a determination of a possible class corresponding to the reported ethics violation.

At step 316, the ethics violation detection module 106 prioritizes reported ethics violations into one or more lists based on the determination of the possible class. The ethics violation detection module 106 sorts the set of digital records based on the corresponding determination value, and ranks the sorted set of digital records based on the set of labels against a list of control labels and priorities. The list of control labels and priorities can be established by the owner of the prioritization system 102.

At step 318, the ethics violation detection module 106 transmits the prioritized list to a user interface. The ethics violation detection module 106 can transmit the prioritized list across a network in an embodiment where the prioritization system 102 executes on distributed resources. Alternatively, in the embodiment where the prioritization system 102 executes on a single physical server with an attached display, the prioritized list can be received through a graphical server API or an event notification with a pointer to an address in memory where the prioritized list resides.

Figure 4:
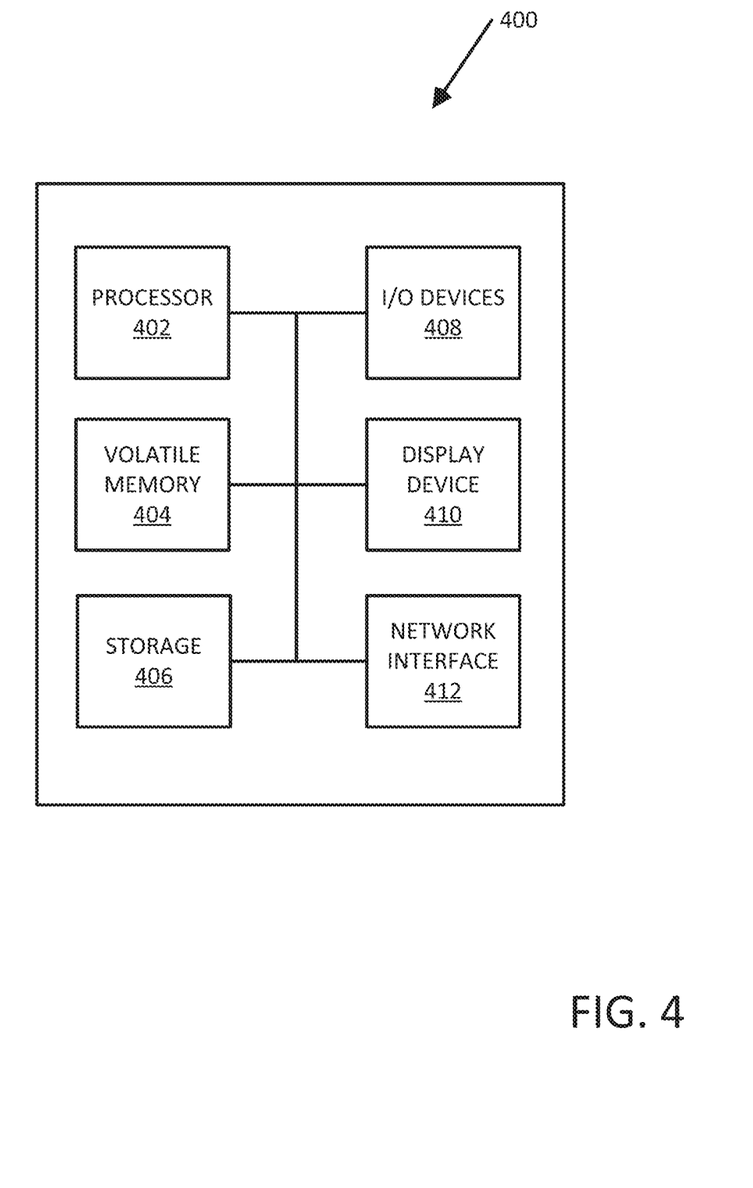
FIG. 4 is a block diagram illustrating a computing device for the detection and visualization of reported ethics cases according to an exemplary embodiment.

FIG. 4 is a block diagram illustrating a computing device 400 for the detection and visualization of reported ethics cases according to an exemplary embodiment.

The computing device 400 supports the detection and visualization of reported ethics cases. The computing device 400 can embody the prioritization system 102 on which the natural language processing module 104 and the ethics violation detection module 106 can execute on. The computing device 400 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives, one or more solid state disks), and the like. For example, volatile memory 404 included in the computing device 400 can store computer-readable and computer-executable instructions or software for implementing exemplary operations of the computing device 400. The computing device 400 also includes configurable and/or programmable processor 402 for executing computer-readable and computer-executable instructions or software stored in the volatile memory 404 and other programs for implementing exemplary embodiments of the present disclosure. Processor 402 can be a single core processor or a multiple core processor. Processor 402 can be configured to execute one or more of the instructions described in connection with computing device 400.

Volatile memory 404 can include a computer system memory or random access memory, such as DRAM, SRAM, EDO RAM, and the like. Volatile memory 404 can include other types of memory as well, or combinations thereof.

A user can interact with the computing device 400 through a display 410, such as a computer monitor, which can display one or more graphical user interfaces supplemented by I/O devices 408, which can include a multi-touch interface, a pointing device, an image capturing device and a reader.

The computing device 400 can also include storage 406, such as a hard-drive, CD-ROM, or other computer-readable media, for storing data and computer-readable instructions and/or software that implement exemplary embodiments of the present disclosure (e.g., applications). For example, storage 406 can include one or more storage mechanisms for storing inputs and outputs for machine learning data models which can be indexed accordingly.

The computing device 400 can include a network interface 412 configured to interface via one or more network devices with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the network interface 412 can include one or more antennas to facilitate wireless communication between the computing device 400 and a network and/or between the computing device 400 and other computing devices. The network interface 412 can include a built-in network adapter, network interface card, PCMCIA network card, card bus network adapter, wireless network adapter, USB network adapter, modem or any other device suitable for interfacing the computing device 400 to any type of network capable of communication and performing the operations described herein.

Figure 5:
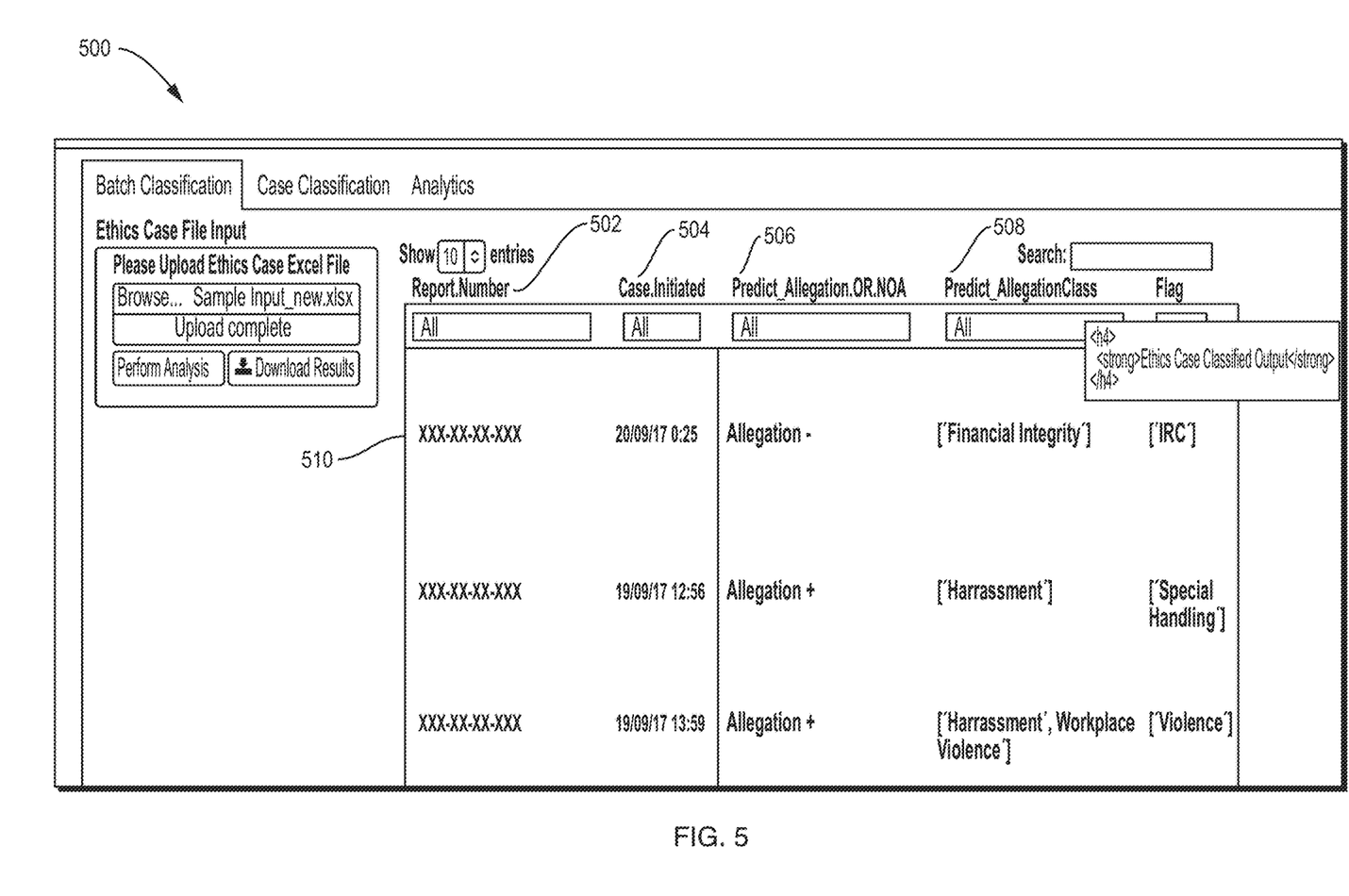
FIG. 5 illustrates a composite visualization of reported ethics cases according to an exemplary embodiment.

FIG. 5 is a screen capture 500 illustrating a composite visualization of reported ethics cases according to an exemplary embodiment. The screen capture 500 includes multiple rows, where each row corresponds to an ethics case 510. The screen capture 500 corresponds to the visualization of the prioritized list as presented on the user interface 108.

In the screen capture 500 an ethics case 510 represented as a row. Various captured characteristics corresponding to the ethics case 510 are displayed in columns. The ethics cases 510 (e.g. rows) can be prioritized or sorted utilizing the column identifiers 502, 504, 506, 508, each of which correspond to a different characteristic of the ethics case 510/

A column corresponding to a report number 502 can be displayed. Often, the report number 502 field is a unique field corresponding to an ethics case.

A column corresponding to when the case initiation 504 can be displayed. The corresponding date timestamp is presented as to indicate when case was reported to the corresponding submission system 112A, 112B, 112C.

A column corresponding to allegation prediction 506 corresponds to a prediction of an allegation. The allegation prediction 506 characteristic corresponds to the predictive result of the binary machine learning data model. The allegation prediction 506 field indicates that the prioritization system 102 determined that the corresponding ethics case 510 is an actual ethics violation. As show here, the values indicate a "−" for negative and a "+" for positive.

A column corresponding to class prediction 508 corresponds to the classification of the ethics case. The class prediction 508 characteristic corresponds to the predictive result of the multi-class machine learning data model. The class prediction 508 field indicates that the prioritization system 102 determined that the corresponding ethics case 510 pertains to a certain type of ethics violation. Prioritization of ethics cases can be set based on the class prediction 508 characteristic.

Figure 6:
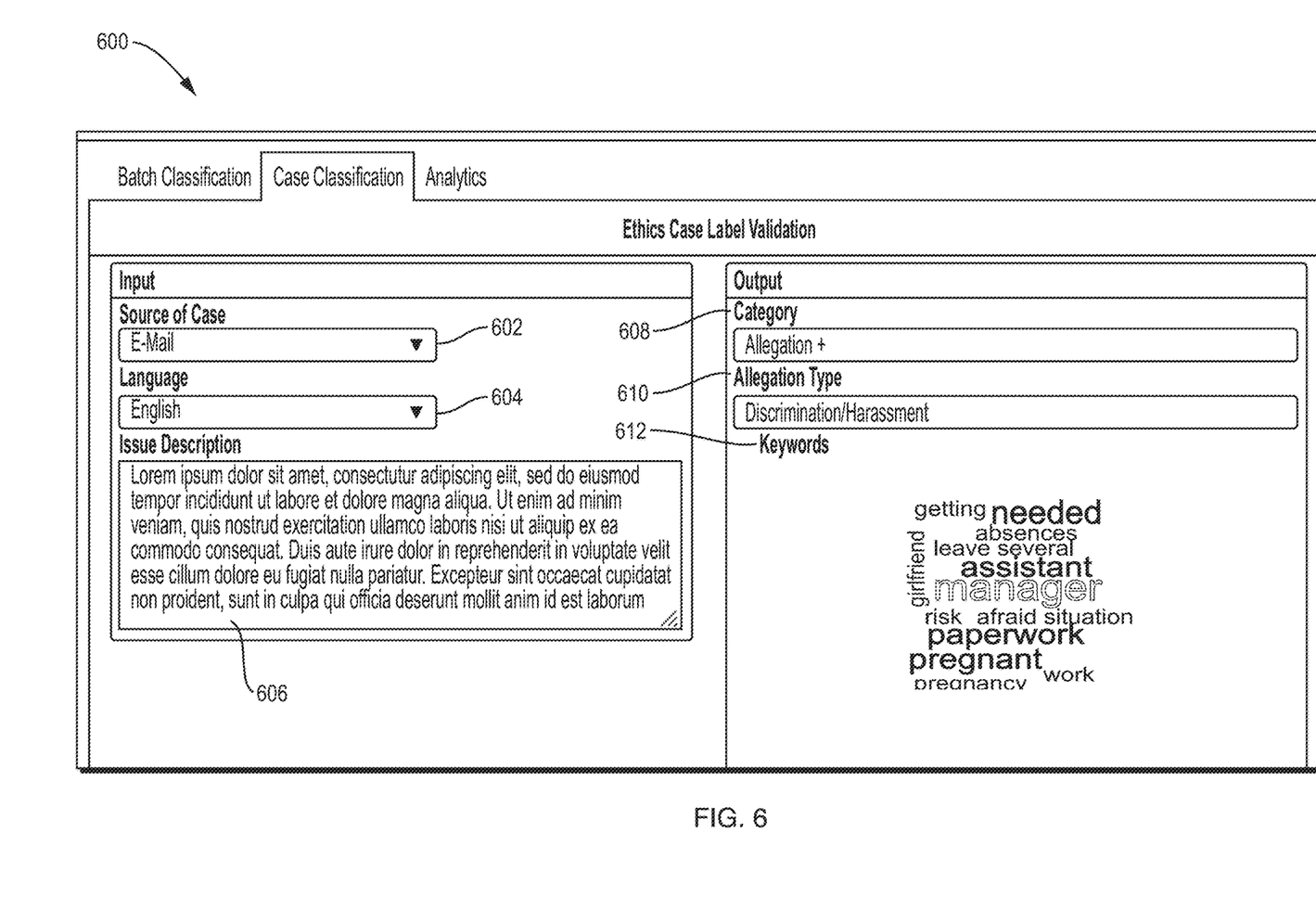
FIG. 6 illustrates visualization of a reported ethic case according to an exemplary embodiment.

FIG. 6 is a screen capture 600 illustrating the visualization of a reported ethic case according to an exemplary embodiment. The screen capture 600 represents a single ethics case with fields corresponding to inputs such as submission source 602, submission language 604, and issue description 606. Additionally the screen capture 600 provides corresponding output fields such as category 608, allegation type 610, and keywords 612 (e.g., as a word cloud).

The submission source 602 field corresponds to the submission system 112A, 112B, 112C from which the ethics claim was reported. For example, "email" can be a submission source 602. The submission language 604 field corresponds to the language that the ethics case was submitted. The submission language 604 can be extracted during pre-processing by the NLP module 104 while the standard text from different sources is removed. The issue description 606 is the textual description of the ethics case as submitted through the submission system 112A, 112B, 112C. The issue description 606 is the content of the ethics case that provides the input to the NLP module 104 utilized as the source for lemmatizing words.

The category 608 corresponds to the determination of the actual ethics violation as determined by the binary machine learning data model. The allegation type 610 corresponds to the determined classification as determined by the multi-class machine learning data model. The keywords 612 correspond to the extracted and stored lemmatized words corresponding to the classification.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components, or steps can be replaced with a single element, component, or step. Likewise, a single element, component, or step can be replaced with multiple elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further, still, other aspects, functions, and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts and that the steps in the exemplary flowcharts can be performed in a different order than the order shown in the illustrative flowcharts.

We claim:

1. A system for the detection and visualization of reported ethics cases within an organization comprising:
   a plurality of disparate systems for reporting ethics violations as corresponding reported claims in a textual form;
   a prioritization system, communicatively coupled to the plurality of disparate systems;
   a natural language processing module configured to execute on the prioritization system, wherein execution of the natural language processing module causes the prioritization system to:
      receive a set of digital records corresponding to the reported claims from the plurality of disparate systems,
      convert each of the digital records from the set of digital records into a common digital format, wherein the common digital format comprises uniform text structure, and
      deconstruct the uniform text structure of each digital record to lemmatize words, remove punctuation, and remove stop words from each of the digital records;
   an ethics violation detection module configured to execute on the prioritization system, wherein execution of the ethics violation detection module causes the prioritization system to:
      receive the deconstructed uniform text structure of each of the digital records from the natural language processing module,
      input each deconstructed uniform text structure into a binary machine learning data model, wherein the binary machine learning data model returns a determination value for the digital record corresponding to a given one of the reported claims, wherein the determination value consists of a binary indication as to whether the given one of the reported claims comprises an ethical allegation or not,
      input each deconstructed uniform text structure into a multiclass machine learning data model, wherein the multiclass machine learning data model returns a determination of a most likely allegation class for the given one of the reported claims when the given one of the reported claims comprises an ethical allegation,
      input each deconstructed uniform text structure into a multi-label machine learning model, wherein the multi-label machine learning model returns a determination of additional allegation classes for the given one of the reported claims when the given one of the reported claims pertains to more than one allegation class;
      input the determined value, the most likely allegation class, and the additional allegation classes to an ensemble machine learning data model, wherein the ensemble machine learning data model returns a determination of a possible class corresponding to the given one of the reported claims, wherein the possible class belongs to one of a plurality of available classes of ethics violations including alcohol and drug violations, corruption violations, conflict of interest violations, discrimination violations, failure to report violations, financial integrity violations, harassment violations, insider trading violations, retaliation violations, and workplace violence violations,
      prioritize reported claims into one or more lists based on the determination of the possible class; and
      transmit the prioritized list to a user interface;
   wherein at least one of the learning data models is trained using the deconstructed uniform text structure of the digital records as training input, such that the at least one of the learning data models is trained using the reported claims in a normalized format where specialized characters, punctuation, and stop words are removed and remaining words are lemmatized.

2. The system of claim 1 wherein the disparate systems comprises web form submission, email receipt, and transcribed telephone hotline report.

3. The system of claim 1 wherein the binary machine learning data model comprises a binary logistic regression model.

4. The system of claim 1 wherein the multiclass machine learning data model comprises a support vector machine.

5. The system of claim 1 wherein the ensemble machine learning data model comprises a random forest model.

6. The system of claim 1, execution of the ethics violation detection module causes the prioritization system to:
   sort the set of digital records based on the corresponding determination value, and
   rank the sorted set of digital records based on a set of labels against a list of control labels and priorities.

7. The system of claim 1, wherein the execution of the natural language processing module causes the prioritization system to convert each digital record by removing special characters and text formatting information from each digital record.

8. A method for the detection and visualization of reported ethics cases within an organization comprising:
   receiving a set of digital records corresponding to reported ethics violations as corresponding reported claims in a textual form from a plurality of disparate systems;
   converting, each of the digital records from the set of digital records into a common digital format, wherein the common digital format comprises uniform text structure;
   deconstructing the uniform text structure of each digital record by a natural language processing module to lemmatize words, remove punctuation, and remove stop words from each of the digital records;
   receiving the deconstructed uniform text structure of each of the digital records from the natural language processing module;
   inputting each deconstructed uniform text structure into a binary machine learning data model, wherein the binary machine learning data model returns a determination value for the digital record corresponding to each given one of the reported claims, wherein the determination value consists of a binary indication as to whether the given one of the reported claims comprises an ethical allegation or not;
   inputting each deconstructed uniform text structure into a multiclass machine learning data model, wherein the multiclass machine learning data model returns a determination of a most likely allegation class for the given one of the reported claims when the given one of the reported claims comprises an ethical allegation;

inputting each deconstructed uniform text structure into a multi-label machine learning model, wherein the multi-label machine learning model returns a determination of additional allegation classes for the given one of the reported claims when the given one of the reported claims pertains to more than one allegation class;

inputting the determined value, the most likely allegation class, and the additional allegation classes to an ensemble machine learning data model, wherein the ensemble machine learning data model returns a determination of a possible class corresponding to each given one of the reported claims, wherein the possible class belongs to one of a plurality of available classes of ethics violations including alcohol and drug violations, corruption violations, conflict of interest violations, discrimination violations, failure to report violations, financial integrity violations, harassment violations, insider trading violations, retaliation violations, and workplace violence violations;

prioritizing reported claims into one or more lists based on the determination of the possible class; and transmitting the prioritized list to a display;

wherein at least one of the learning data models is trained using the deconstructed uniform text structure of the digital records as training input, such that the at least one of the learning data models is trained using the reported claims in a normalized format where specialized characters, punctuation, and stop words are removed and remaining words are lemmatized.

9. The method of claim 8 wherein the disparate systems comprises web form submission, email receipt, and transcribed telephone hotline report.

10. The method of claim 8 wherein the binary machine learning data model comprises a binary logistic regression model.

11. The method of claim 8 wherein the multiclass machine learning data model comprises a support vector machine.

12. The method of claim 8 wherein the ensemble machine learning data model comprises a random forest model.

13. The method of claim 8, further comprising:
sorting the set of digital records based on the corresponding determination value, and
ranking the sorted set of digital records based on the set of labels against a list of control labels and priorities.

14. The method of claim 8, the converting further comprising removing special characters and text formatting information from each digital record.

15. A non-transitory computer readable medium, having stored thereon, instructions that when executed by a computing device, cause the computing device to perform operations comprising:
receiving a set of digital records corresponding to reported ethics violations as corresponding reported claims in a textual form from a plurality of disparate systems;
converting, each of the digital records from the set of digital records into a common digital format, wherein the common digital format comprises uniform text structure;
deconstructing the uniform text structure of each digital record by a natural language processing module to lemmatize words, remove punctuation, and remove stop words from each of the digital records;
receiving the deconstructed uniform text structure of each of the digital records from the natural language processing module;
inputting each deconstructed uniform text structure into a binary machine learning data model, wherein the binary machine learning data model returns a determination value for the digital record corresponding to each given one of the reported claims, wherein the determination value consists of a binary indication as to whether the given one of the reported claims comprises an ethical allegation or not;
inputting each deconstructed uniform text structure into a multiclass machine learning data model, wherein the multiclass machine learning data model returns a determination of a most likely allegation class for the given one of the reported claims when the given one of the reported claims comprises an ethical allegation;
inputting each deconstructed uniform text structure into a multi-label machine learning model, wherein the multi-label machine learning model returns a determination of additional allegation classes for the given one of the reported claims when the given one of the reported claims pertains to more than one allegation class;
inputting the determined value, the most likely allegation class, and the additional allegation classes to an ensemble machine learning data model, wherein the ensemble machine learning data model returns a determination of a possible class corresponding to each given one of the reported claims, wherein the possible class belongs to one of a plurality of available classes of ethics violations including alcohol and drug violations, corruption violations, conflict of interest violations, discrimination violations, failure to report violations, financial integrity violations, harassment violations, insider trading violations, retaliation violations, and workplace violence violations;
prioritizing reported claims into one or more lists based on the determination of the possible class; and
transmitting the prioritized list to a display;

wherein at least one of the learning data models is trained using the deconstructed uniform text structure of the digital records as training input, such that the at least one of the learning data models is trained using the reported claims in a normalized format where specialized characters, punctuation, and stop words are removed and remaining words are lemmatized.

16. The computer readable medium of claim 15 further comprising instructions that when executed by a computing device, cause the computing device to perform:
sorting the set of digital records based on the corresponding determination value, and
ranking the sorted set of digital records based on the set of labels against a list of control labels and priorities.

17. The computer readable medium of claim 15 the instructions to convert further comprising instructions that when executed by a computing device, cause the computing device to perform removing special characters and text formatting information from each digital record.

* * * * *

UNITED STATES PATENT AND TRADEMARK OFFICE
CERTIFICATE OF CORRECTION

PATENT NO. : 11,636,433 B2
APPLICATION NO. : 16/216317
DATED : April 25, 2023
INVENTOR(S) : David Ferguson et al.

It is certified that error appears in the above-identified patent and that said Letters Patent is hereby corrected as shown below:

In the Claims

In Column 10, Claim 6, Line 30, delete "execution" and insert -- wherein the execution --

In Column 12, Claim 16, Line 51, delete "The computer" and insert -- The non-transitory computer --

In Column 12, Claim 17, Line 58, delete "The computer" and insert -- The non-transitory computer --

Signed and Sealed this
Fifteenth Day of August, 2023

Katherine Kelly Vidal
*Director of the United States Patent and Trademark Office*